(12) United States Patent
Chmiel et al.

(10) Patent No.: US 9,344,953 B2
(45) Date of Patent: May 17, 2016

(54) APPARATUS AND METHOD FOR INITIALIZATION AND MAPPING OF REFERENCE SIGNALS IN A COMMUNICATION SYSTEM

(75) Inventors: Mieszko Chmiel, Glucholazy (PL);
Peter Skov, Beijing (CN); Tommi Tapani Koivisto, Espoo (FI);
Xiangguang Che, Beijing (CN); Timo Roman, Espoo (FI)

(73) Assignee: Nokia Technologies Oy, Espoo (FI)

( * ) Notice: Subject to any disclaimer, the term of this patent is extended or adjusted under 35 U.S.C. 154(b) by 567 days.

(21) Appl. No.: 12/857,383

(22) Filed: Aug. 16, 2010

(65) Prior Publication Data

US 2011/0038344 A1    Feb. 17, 2011

Related U.S. Application Data

(60) Provisional application No. 61/234,534, filed on Aug. 17, 2009.

(51) Int. Cl.
*H04W 4/00*     (2009.01)
*H04W 48/08*    (2009.01)
*H04W 72/04*    (2009.01)

(52) U.S. Cl.
CPC ............. *H04W 48/08* (2013.01); *H04W 72/04* (2013.01)

(58) Field of Classification Search
CPC ............................ H04W 72/02; H04W 72/04
USPC ................. 370/329, 330, 336–344, 395.4; 455/450–452, 464
See application file for complete search history.

(56) References Cited

U.S. PATENT DOCUMENTS 8,588,150 B2   11/2013  Luo et al. ............ 370/329
8,842,515 B2    9/2014  Lee et al. ............ 370/209
(Continued)

FOREIGN PATENT DOCUMENTS

WO     WO-97/37438 A1    10/1997
WO     WO 2009/023860 A1  2/2009
WO     WO 2010/109320 A1  9/2010

OTHER PUBLICATIONS

3GPP TS 36.211 V8.7.0 (May 2009), Technical Specification, $3^{rd}$ Generation Partnership Project; Technical Specification Group Radio Access Network; Evolved Universal Terrestrial Radio Access (E-UTRA); Physical Channels and Modulation (Release 8), (83 pages).

(Continued)

*Primary Examiner* — Kan Yuen
(74) *Attorney, Agent, or Firm* — Harrington & Smith

(57) ABSTRACT

An apparatus and method for initialization and mapping of reference signals in a communication system. In one embodiment, the apparatus includes a processor and memory including computer program code. The memory and the computer program code are configured to, with the processor, cause the apparatus to generate a reference signal employable with a plurality of physical resource blocks corresponding to a bandwidth of a communication system, and allocate resource elements of an assigned physical resource block from the plurality of physical resource blocks to a user equipment. The memory and the computer program code are further configured to, with the processor, cause the apparatus to generate a dedicated reference signal for the user equipment by allocating elements of the reference signal in accordance with allocated resource elements of the assigned physical resource block.

12 Claims, 5 Drawing Sheets

(56) References Cited

U.S. PATENT DOCUMENTS

| | | | |
|---|---|---|---|
| 9,014,138 B2 | 4/2015 | Fong et al. | |
| 9,094,167 B2 | 7/2015 | Zhang et al. | 370/329 |
| 2002/0159411 A1* | 10/2002 | Airy et al. | 370/330 |
| 2008/0049851 A1* | 2/2008 | Nangia et al. | 375/260 |
| 2008/0260062 A1 | 10/2008 | Imamura | 375/267 |
| 2009/0252077 A1* | 10/2009 | Khandekar et al. | 370/312 |
| 2010/0035611 A1* | 2/2010 | Montojo | H04J 11/0069 455/434 |
| 2010/0062783 A1* | 3/2010 | Luo et al. | 455/450 |
| 2010/0220800 A1* | 9/2010 | Erell et al. | 375/267 |
| 2012/0008576 A1* | 1/2012 | Lin | H04B 7/0691 370/329 |

OTHER PUBLICATIONS

3GPP TR 36.814 V0.4.1 (Feb. 2009), Technical Report, 3$^{rd}$ Generation Partnership Project; Technical Specification Group Radio Access Network; Further Advancements for E-UTRA Physical Layer Aspects (Release 9), (31 pages).

3GPP TSG-RAN Working Group 1 #52, Nokia Siemens Networks, et al. "Way Forward on Scrambling Sequence Initalisation", (Feb. 11-15, 2008), R1-081106, (2 pages).

3GPP TS RAN WG1 Meeting #57bis, Catt, et al., "Beamforming Based MU-MIMO", Jun. 29- Jul. 3, 2009), R1-092771, (6 pages).

3GPP Technical Specification, "3$^{rd}$ Generation Partnership Project; Technical Specification Group Radio Access Network; Evolved Universal Terrestrial Radio Access (E-UTRA) and Evolved Universal Terrestrial Radio Network (E-UTRAN); Overal description; Stage 2 (Release 8)," 3GPP TS 36.300 V8.5.0 May 2008, 134 pages.

3GPP Technical Specification, "3rd Generation Partnership Project; Technical Specification Group Radio Access Network; Further Advancements for E-UTRA Physical Layer Aspects (Release 9)," 3GPP TR 36.814 V0.41 Feb. 2009, 31 pages.

3GPP Technical Specification, "3rd Generation Partnership Project; Technical Specification Group Radio Access Network; Evolved Universal Terrestrial Radio Access (E-UTRA); Physical Channels and Modulation (Release 8)," 3GPP TS 36.211 V8.7.0 May 2009, 83 pages.

3GPP Technical Specification, "3$^{rd}$ Generation Partnership Project; Technical Specification Group Radio Access Network; Evolved Universal Terrestrial Radio Access (E-UTRA); Physical layer procedures (Release 8)," 3GPP TS 36.213 V8.7.0 May 2009, 77 pages.

3GPP Work Item Description Document RP-090359, "Enhanced DL transmission for LTE," TSG-RAN Meeting #43, Biarritz, France, Mar. 3-6, 2009, 5 pages.

3GPP TSG-RAN WG1 #57bis, "Downlink Multi-Cell Demodulation Reference Signal Design," R1-092584, WOASIS, Los Angeles, Ca., Jun. 29-Jul. 3, 2009, 7 pages.

3GPP TSG RAN WG1 Meeting #57bis, "UE-specific reference symbols for dual-layer beanforming," R1-092554, Nokia, Nokia Siemens Network, Los Angeles, Ca., Jun. 29-Jul. 3, 2009, 6 pages.

3GPP TSG RAN WG1 Meeting #57bis, "UE-specific reference symbol multiplexing for LTE-Advanced downlink," R1-092556, Nokia, Nokia Siemens Networks, Los Angeles, Ca., Jun. 29-Jul. 3, 2009, 8 pages.

3GPP TSG-RAN WG1 #57bis, "Link analyses of different reference signal designs for dual-stream beamforming," R1-092686, Qualcomm Europe, Los Angeles, Ca., Jun. 29-Jul. 3, 2009, 9 pages.

3GPP TSG RAN WG1 Meeting #57bis, "DL Control Signaling for Dual-layer Beamforming in Rel '9," R1-092553, Nokia, Nokia Siemens Networks, Los Angeles, Ca., Jun. 29-Jul. 3, 2009, 4 pages.

3GPP TSG RAN WG1 #57bis, "Control Signaling for LTE Rel-9 Enhanced DL transmission," R1-092632, Motorola, Los Angeles, Ca., Jun. 29-Jul. 3, 2009, 7 pages.

3GPP TSG-RAN Working Group 1 #52, "Scrambling Sequence Initialisation," Tdoc R1-080940, Nokia, Nokia Siemens Networks, Sorrento, Italy, Feb. 11-15, 2008, 4 pages.

3GPP TSG RAN1 #52, "Specification details for PRS sequences," R1-080640, Qualcomm Europe, Sorrento, Italy, Feb. 11-15, 2008, 3 pages.

3GPP TSG-RAN WG1 #56, "Further Considerations and Link Simulations on Reference Signals in LTE-A," R1-090875, Qualcomm Europe, Athens, Greece, Feb. 9-13, 2009, 7 pages.

R. Gautier, et al., "Blind estimation of scrambler offset using encoder redundancy", http://ieeexplore.ieee.org/xpl/articleDetails.jsp?arnumber=1197256>, Nov. 3-6, 2002, 1 pg.

* cited by examiner

1

APPARATUS AND METHOD FOR INITIALIZATION AND MAPPING OF REFERENCE SIGNALS IN A COMMUNICATION SYSTEM

This application claims the benefit of U.S. Provisional Application No. 61/234,534, entitled "Apparatus and Method for Initialization and Mapping of Reference Signals in a Communication System," filed on Aug. 17, 2009, which is incorporated herein by reference.

TECHNICAL FIELD

The present invention is directed, in general, to communication systems and, in particular, to an apparatus and method for initialization and mapping of reference signals in a communication system.

BACKGROUND

Long Term Evolution ("LTE") of the Third Generation Partnership Project ("3GPP"), also referred to as 3GPP LTE, refers to research and development involving 3GPP Release 8 and beyond, which is the name generally used to describe an ongoing effort across the industry aimed at identifying technologies and capabilities that can improve systems such as the universal mobile telecommunication system ("UMTS"). The goals of this broadly based project include improving communication efficiency, lowering costs, improving services, making use of new spectrum opportunities, and achieving better integration with other open standards. Further developments in these areas are also referred to as Long Term Evolution-Advanced ("LTE-A").

The evolved UMTS terrestrial radio access network ("E-UTRAN") in 3GPP includes base stations providing user plane (including packet data convergence protocol/radio link control/medium access control/physical ("PDCP/RLC/MAC/PHY") sublayers) and control plane (including radio resource control ("RRC") sublayer) protocol terminations towards wireless communication devices such as cellular telephones. A wireless communication device or terminal is generally known as user equipment ("UE") or a mobile station ("MS"). A base station is an entity of a communication network often referred to as a Node B or an NB. Particularly in the E-UTRAN, an "evolved" base station is referred to as an eNodeB or an eNB. For details about the overall architecture of the E-UTRAN, see 3GPP Technical Specification ("TS") 36.300, v8.5.0 (2008-05), which is incorporated herein by reference. The terms base station, NB, eNB, and cell refer generally to equipment providing the wireless-network interface in a cellular telephone system, and will be used interchangeably herein, and include cellular telephone systems other than those designed under 3GPP standards.

Orthogonal frequency division multiplex(ing) ("OFDM") is a multi-carrier data transmission technique that is advantageously used in radio frequency based communication systems such as 3GPP E-UTRAN/LTE/3.9G, IEEE 802.16d/e Worldwide Interoperability for Microwave Access ("WiMAX"), IEEE 802.11a/WiFi, fixed wireless access ("FWA"), high performance radio local area network ("HiperLAN"), digital audio broadcast, ("DAB"), digital video broadcast ("DVB"), and others including wired digital subscriber lines ("DSLs"). The OFDM systems typically divide available frequency spectrum into a plurality of carriers that are transmitted in a sequence of time slots. Each of the plurality of carriers has a narrow bandwidth and is modulated with a low-rate data stream. The carriers are closely spaced and orthogonal separation of the carriers controls inter-carrier interference ("ICI").

When generating an OFDM signal, each carrier is assigned a data stream that is converted to samples from a constellation of admissible sample values based on a modulation scheme such as quadrature amplitude modulation ("QAM,") including binary phase shift keying ("BPSK"), quadrature phase shift keying ("QPSK"), and higher-order variants (16QAM, 64QAM, etc), and the like. Once phases and amplitudes are determined for the particular samples, the samples are converted to time-domain signals for transmission. A sequence of samples, such as a 128-sample sequence, is collectively assembled into a "symbol." Typically, OFDM systems use an inverse discrete Fourier transform ("iDFT") such as an inverse fast Fourier transform ("iFFT") to perform conversion of the symbols to a sequence of time-domain sample amplitudes that are employed to form a time domain transmitted waveform. The iFFT is an efficient process to map data onto orthogonal subcarriers. The time domain waveform is then up-converted to the radio frequency ("RF") of the appropriate carrier and transmitted. A particular issue for system operation including OFDM is calibration of frequency of a local oscillator in the user equipment and absolute time at the user equipment so that an OFDM signal can be accurately detected and demodulated.

As wireless communication systems such as cellular telephone, satellite, and microwave communication systems become widely deployed and continue to attract a growing number of users, there is a pressing need to accommodate a large and variable number of communication devices transmitting a growing range of communication applications with fixed communication resources. The 3GPP is currently studying various potential enhancements to the 3GPP LTE Release 8 to specify a new system called LTE-Advanced, which is supposed to fulfill the International Mobile Telecommunications-Advanced ("IMT-Advanced") requirements set by the International Telecommunications Union-Radiocommunication Sector ("ITU-R"). Topics within the ongoing study item include bandwidth extensions beyond 20 megahertz ("MHz"), communication link relays, cooperative multiple input/multiple output ("MIMO"), uplink multiple access schemes and MIMO enhancements.

To provide accurate detection of a received signal in a wireless communication system, it is generally necessary to transmit a reference signal that is embedded in a signal such as an OFDM signal to enable calibration of a local oscillator/clock, assistance with channel estimation, demodulation and decoding in a receiver. The reference signal can be constructed from a Gold code, and the reference signal is generally re-initiated in each subframe of a transmission sequence and depends on the user equipment identification ("UE ID"), the base station identification ("ID"), the physical resource block allocation, and the subframe number. Communication issues such as orthogonality between user equipment, suppression of mutual interference between user equipment, and the necessary accounting processes associated with the generation of a reference signal dependent on many variables results in substantial complexities and trade-offs for management of communication among a large number of end users.

In view of the growing deployment of communication systems such as cellular communication systems, further improvements are necessary for generation of reference signals. Therefore, what is needed in the art is a system and method that avoid the associated reference signal deficiencies of conventional communication systems.

SUMMARY OF THE INVENTION

These and other problems are generally solved or circumvented, and technical effects are generally achieved, by embodiments of the present invention, which include an apparatus and method for initialization and mapping of reference signals in a communication system. In one embodiment, the apparatus includes a processor and memory including computer program code. The memory and the computer program code are configured to, with the processor, cause the apparatus to generate a reference signal employable with a plurality of physical resource blocks corresponding to a bandwidth of a communication system, and allocate resource elements of an assigned physical resource block from the plurality of physical resource blocks to a user equipment. The memory and the computer program code are further configured to, with the processor, cause the apparatus to generate a dedicated reference signal for the user equipment by allocating elements of the reference signal in accordance with allocated resource elements of the assigned physical resource block.

In another aspect, an embodiment of the present invention is directed to an apparatus including means for generating a reference signal employable with a plurality of physical resource blocks corresponding to a bandwidth of a communication system, and means for allocating resource elements of an assigned physical resource block from the plurality of physical resource blocks to a user equipment. The apparatus also includes means for generating a dedicated reference signal for the user equipment by allocating elements of the reference signal in accordance with allocated resource elements of the assigned physical resource block.

In another aspect, an embodiment of the present invention is directed to a computer program product including a program code stored in a computer readable medium configured to generate a reference signal employable with a plurality of physical resource blocks corresponding to a bandwidth of a communication system, and allocate resource elements of an assigned physical resource block from the plurality of physical resource blocks to a user equipment. The program code stored in the computer readable medium is also configured to generate a dedicated reference signal for the user equipment by allocating elements of the reference signal in accordance with allocated resource elements of the assigned physical resource block.

In another aspect, an embodiment of the present invention is directed to a method including generating a reference signal employable with a plurality of physical resource blocks corresponding to a bandwidth of a communication system, and allocating resource elements of an assigned physical resource block from the plurality of physical resource blocks to a user equipment. The method also includes generating a dedicated reference signal for the user equipment by allocating elements of the reference signal in accordance with allocated resource elements of the assigned physical resource block.

The foregoing has outlined rather broadly the features and technical effects of the present invention in order that the detailed description of the invention that follows may be better understood. Additional features and technical effects of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the technical effects thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. In view of the foregoing, the present invention will be described with respect to exemplary embodiments in a specific context of an apparatus, system and method for generating reference signals and allocating associated resources in a communication system. Although the apparatus, system and method described herein are described with reference to a 3GPP LTE communication system, they can be applied to any communication system such as a WiMAX communication system.

Figure 1:
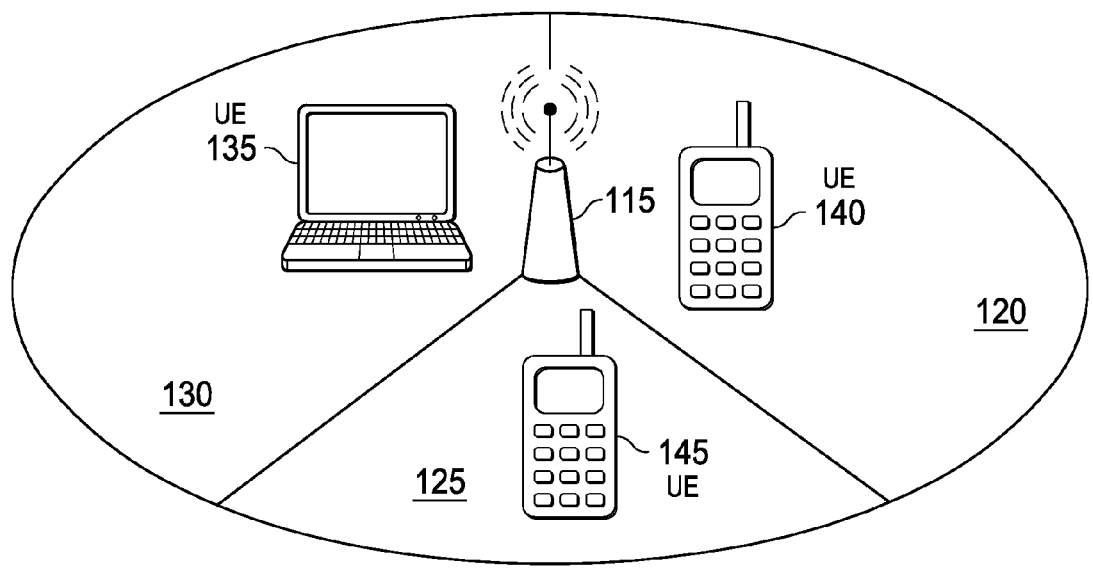
FIGS. 1 and 2 illustrate system level diagrams of embodiments of communication systems including a base station and wireless communication devices that provide an environment for application of the principles of the present invention.

Turning now to FIG. 1, illustrated is a system level diagram of an embodiment of a communication system including a base station 115 and wireless communication devices (e.g., user equipment) 135, 140, 145 that provides an environment for application of the principles of the present invention. The base station 115 is coupled to a public switched telephone network or a packet switched network (not shown). The base station 115 is configured with a plurality of antennas to transmit and receive signals in a plurality of sectors including a first sector 120, a second sector 125, and a third sector 130, each of which typically spans 120 degrees. Although FIG. 1 illustrates one wireless communication device (e.g., wireless communication device 140) in each sector (e.g., the first sector 120), a sector (e.g., the first sector 120) may generally contain a plurality of wireless communication devices. In an alternative embodiment, a base station 115 may be formed with only one sector (e.g., the first sector 120), and multiple base stations may be constructed to transmit according to collaborative/cooperative MIMO ("C-MIMO") operation, etc. The sectors (e.g., the first sector 120) are formed by focusing and phasing radiated signals from the base station antennas, and separate antennas may be employed per sector (e.g., the first sector 120). The plurality of sectors 120, 125, 130 increases the number of subscriber stations (e.g., the wireless communication devices 135, 140, 145) that can simultaneously communicate with the base station 115 without the need to increase the utilized bandwidth by reduction of interference that results from focusing and phasing base station antennas.

Figure 2:
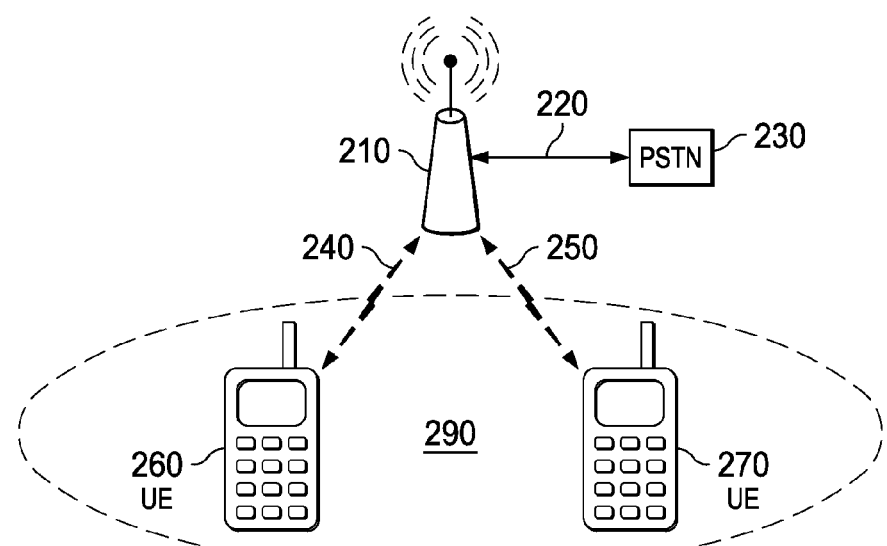

Turning now to FIG. 2, illustrated is a system level diagram of an embodiment of a communication system including wireless communication devices that provides an environment for application of the principles of the present invention. The communication system includes a base station 210 coupled by communication path or link 220 (e.g., by a fiber-optic communication path) to a core telecommunications network such as public switched telephone network ("PSTN") 230 or a packet switched network. The base station 210 is coupled by wireless communication paths or links 240, 250 to wireless communication devices 260, 270, respectively, that lie within its cellular area 290.

In operation of the communication system illustrated in FIG. 2, the base station 210 communicates with each wireless communication device 260, 270 through control and data communication resources allocated by the base station 210 over the communication paths 240, 250, respectively. The control and data communication resources may include frequency and time-slot communication resources in frequency division duplex ("FDD") and/or time division duplex ("TDD") communication modes.

Figure 3:
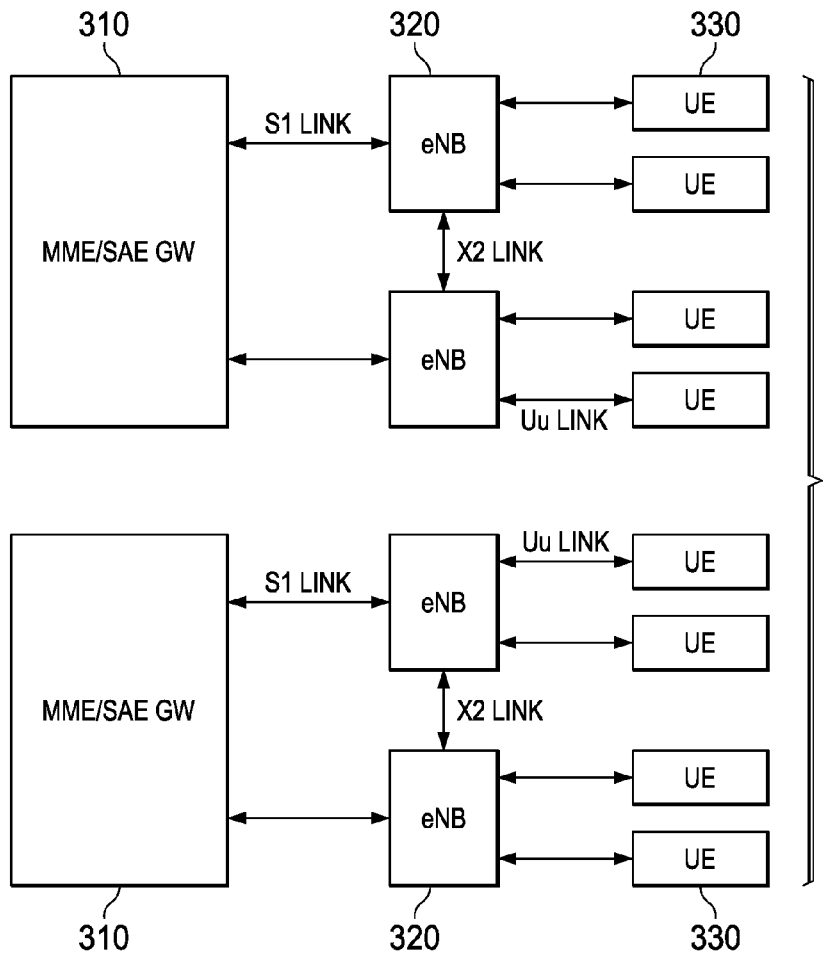
FIGS. 3 and 4 illustrate system level diagrams of embodiments of communication systems including a wireless communication systems that provide an environment for application of the principles of the present invention.

Turning now to FIG. 3, illustrated is a system level diagram of an embodiment of a communication system including a wireless communication system that provides an environment for the application of the principles of the present invention. The wireless communication system may be configured to provide evolved UMTS terrestrial radio access network ("E-UTRAN") universal mobile telecommunications services. A mobile management entity/system architecture evolution gateway ("MME/SAE GW," one of which is designated 310) provides control functionality for an E-UTRAN node B (designated "eNB," an "evolved node B," also referred to as a "base station," ones of which is designated 320) via an S1 communication link (ones of which are designated "S1 link"). The base stations 320 communicate via X2 communication links (designated "X2 link"). The various communication links are typically fiber, microwave, or other high-frequency metallic communication paths such as coaxial links, or combinations thereof.

The base stations 320 communicate with user equipment ("UE," ones of which are designated 330), which is typically a mobile transceiver carried by a user. Thus, communication links (designated "Uu" communication links, ones of which are designated "Uu link") coupling the base stations 320 to the user equipment 330 are air links employing a wireless communication signal such as, for example, an orthogonal frequency division multiplex ("OFDM") signal.

Figure 4:
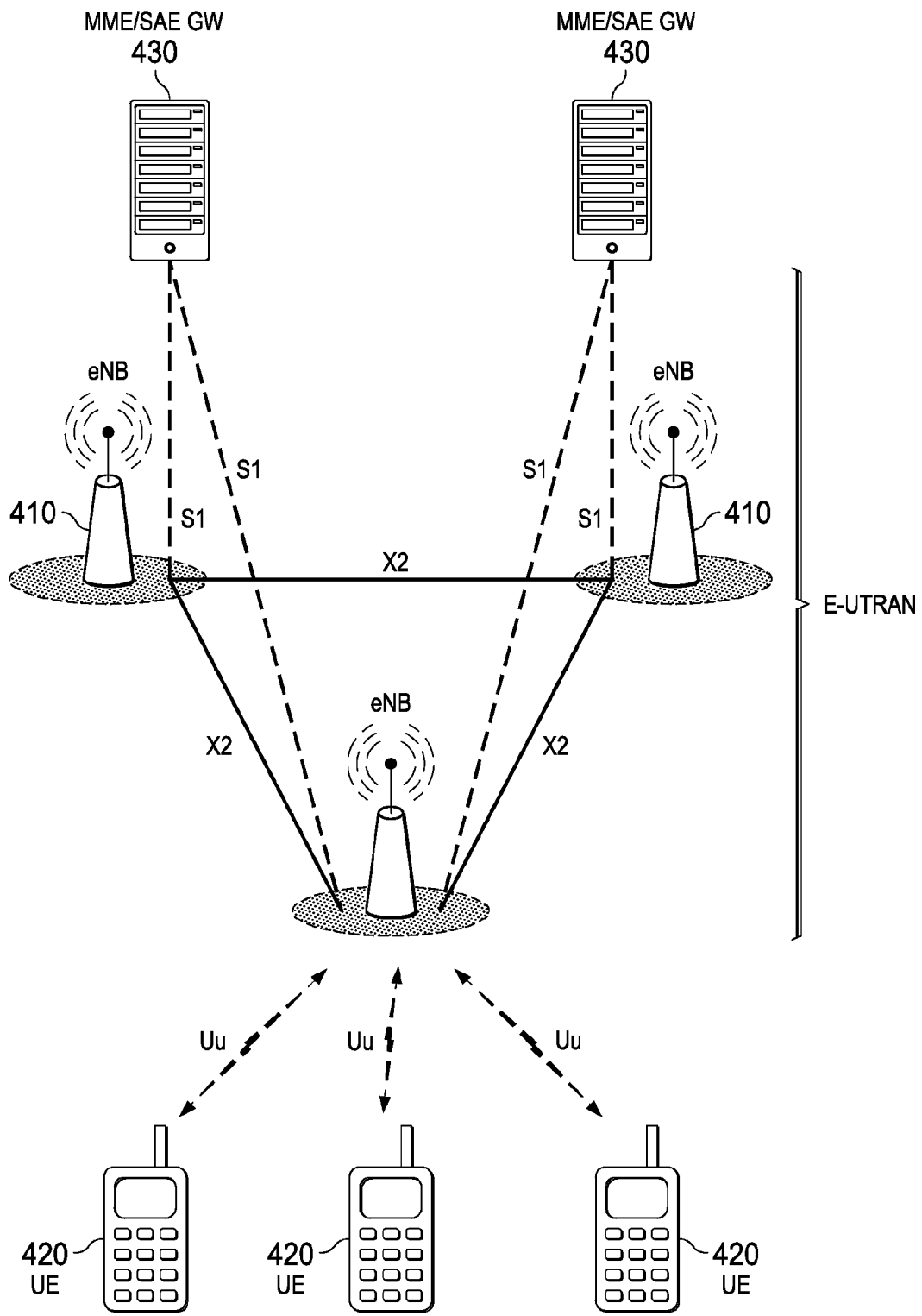

Turning now to FIG. 4, illustrated is a system level diagram of an embodiment of a communication system including a wireless communication system that provides an environment for the application of the principles of the present invention. The wireless communication system provides an E-UTRAN architecture including base stations (one of which is designated 410) providing E-UTRAN user plane (packet data convergence protocol/radio link control/media access control/physical) and control plane (radio resource control) protocol terminations towards user equipment (one of which is designated 420). The base stations 410 are interconnected with X2 interfaces or communication links (designated "X2"). The base stations 410 are also connected by Si interfaces or communication links (designated "S1") to an evolved packet core ("EPC") including a mobile management entity/system architecture evolution gateway ("MME/SAE GW," one of which is designated 430). The S1 interface supports a multiple entity relationship between the mobile management entity/system architecture evolution gateway 430 and the base stations 410. For applications supporting inter-public land mobile handover, inter-eNB active mode mobility is supported by the mobile management entity/system architecture evolution gateway 430 relocation via the S1 interface.

The base stations 410 may host functions such as radio resource management. For instance, the base stations 410 may perform functions such as internet protocol ("IP") header compression and encryption of user data streams, ciphering of user data streams, radio bearer control, radio admission control, connection mobility control, dynamic allocation of resources to user equipment in both the uplink and the downlink, selection of a mobility management entity at the user equipment attachment, routing of user plane data towards the user plane entity, scheduling and transmission of paging messages (originated from the mobility management entity), scheduling and transmission of broadcast information (originated from the mobility management entity or operations and maintenance), and measurement and reporting configuration for mobility and scheduling. The mobile management entity/system architecture evolution gateway 430 may host functions such as distribution of paging messages to the base stations 410, security control, termination of user plane packets for paging reasons, switching of user plane for support of the user equipment mobility, idle state mobility control, and system architecture evolution bearer control. The user equipment 420 receives an allocation of a group of information blocks from the base stations 410.

Figure 5:
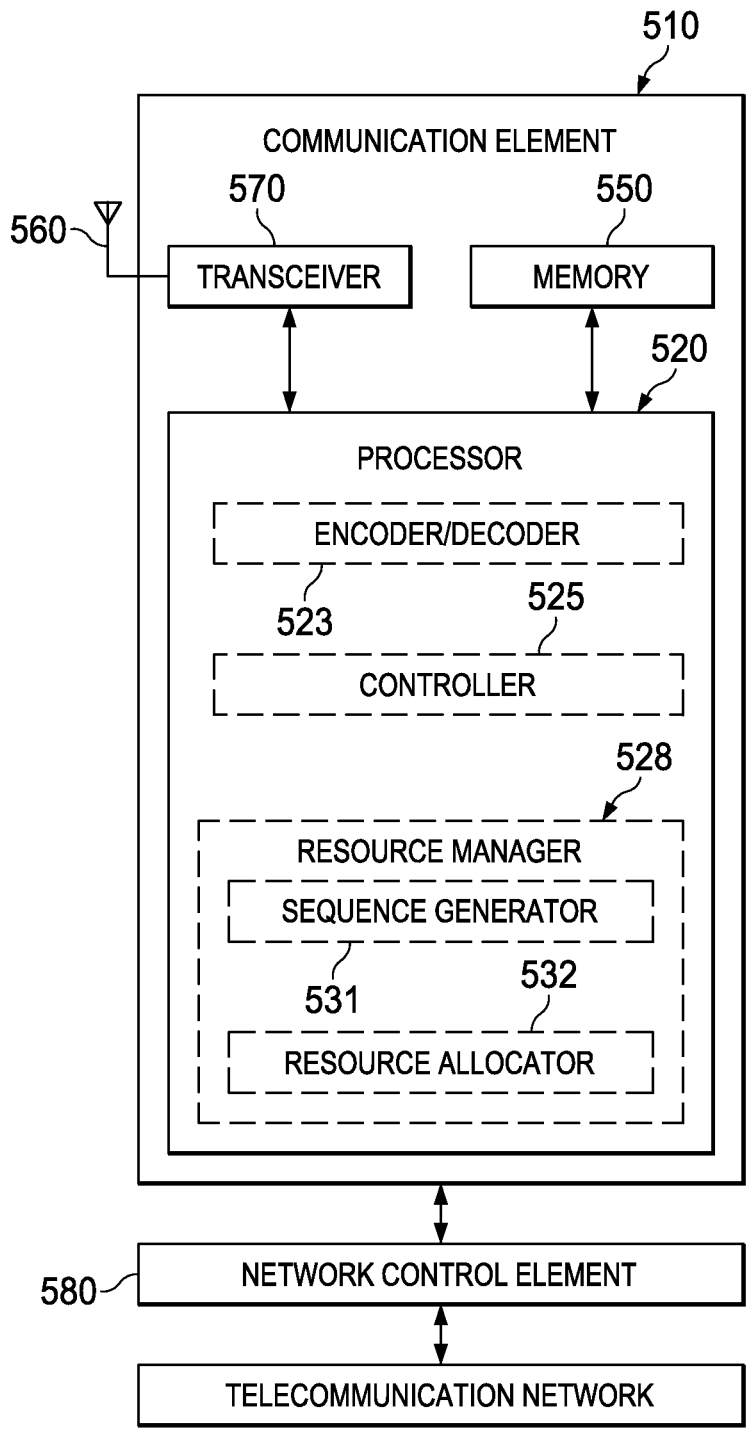
FIG. 5 illustrates a system level diagram of an embodiment of a communication element of a communication system for application of the principles of the present invention.

Turning now to FIG. 5, illustrated is a system level diagram of an embodiment of a communication element 510 of a communication system for application of the principles of the present invention. The communication element or device 510 may represent, without limitation, a base station, user equipment (e.g., a subscriber station, terminal, mobile station, wireless communication device), a network control element, a communication node, or the like. The communication element 510 includes, at least, a processor 520, memory 550 that stores programs and data of a temporary or more permanent nature, an antenna 560, and a radio frequency transceiver 570 coupled to the antenna 560 and the processor 520 for bidirectional wireless communication. The communication element 510 may provide point-to-point and/or point-to-multipoint communication services.

The communication element 510, such as a base station in a cellular network, may be coupled to a communication network element, such as a network control element 580 of a public switched telecommunication network ("PSTN") or a packet switched network. The network control element 580 may, in turn, be formed with a processor, memory, and other electronic elements (not shown). The network control element 580 generally provides access to a telecommunication network such as a PSTN. Access may be provided using fiber optic, coaxial, twisted pair, microwave communication, or similar link coupled to an appropriate link-terminating element. A communication element 510 formed as user equipment is generally a self-contained device intended to be carried by an end user.

The processor 520 in the communication element 510, which may be implemented with one or a plurality of processing devices, performs functions associated with its operation including, without limitation, encoding and decoding (encoder/decoder 523) of individual bits forming a communication message, formatting of information, and overall control (controller 525) of the communication element, including processes related to management of resources (resource manager 528). Exemplary functions related to management of resources include, without limitation, hardware installation, traffic management, performance data analysis, tracking of end users and equipment, configuration management, end user administration, management of user equipment, management of tariffs, subscriptions, and billing, and the like. For instance, in accordance with the memory 550, the resource manager 528 is configured to allocate time and frequency communication resources for transmission of data to/from the communication element 510 during, for instance, multi-user MIMO (also referred to as "MU-MIMO") modes of operation and format messages including the communication resources therefor.

In accordance therewith, the resource manager 528 includes a sequence generator 531 configured to generate a reference signal in a frequency-time order (e.g., a frequency-first order) employable with a plurality of physical resource blocks. The resource manager 528 also includes a resource allocator 532 configured to allocate resource elements of an assigned physical resource block(s) from the plurality of physical resource blocks to a user equipment, and generate a dedicated reference signal for the user equipment by allocating elements of the reference signal to allocated resource elements of the assigned physical resource block(s).

The execution of all or portions of particular functions or processes related to management of resources may be performed in equipment separate from and/or coupled to the communication element 510, with the results of such functions or processes communicated for execution to the communication element 510. The processor 520 of the communication element 510 may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The transceiver 570 of the communication element 510 modulates information onto a carrier waveform for transmission by the communication element 510 via the antenna 560 to another communication element. The transceiver 570 demodulates information received via the antenna 560 for further processing by other communication elements. The transceiver 570 is capable of supporting duplex operation for the communication element 510.

The memory 550 of the communication element 510, as introduced above, may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory 550 may include program instructions or computer program code that, when executed by an associated processor, enable the communication element 510 to perform tasks as described herein.

Of course, the memory 550 may form a data buffer for data transmitted to and from the communication element 510. Exemplary embodiments of the system, subsystems, and modules as described herein may be implemented, at least in part, by computer software executable by processors of, for instance, the user equipment and the base station, or by hardware, or by combinations thereof. As will become more apparent, systems, subsystems and modules may be embodied in the communication element 510 as illustrated and described herein.

A process is introduced herein to create a dedicated reference signal for user equipment (also referred to as a "user equipment-specific reference signal ("URS")), its sequence initialization, and mapping to resource elements of physical resource blocks ("PRBs"). The sequence of elements in a reference signal, each of which may be complex valued, may also be referred to herein as a "reference signal sequence" or "reference signal scrambling sequence." The dedicated reference signal is employed as a demodulation reference signal in a downlink ("DL") from a base station to user equipment, as described in 3GPP Technical Report ("TR") 36.814, v1.0.0, entitled "Further Advancements for E-UTRA Physical Layer Aspects," and in 3GPP Work Item Description Document RP-090359, entitled "Enhanced DL transmission for LTE," which are incorporated herein by reference. A dedicated reference signal is generally present in physical resource blocks scheduled for user equipment and in transmitted spatial layers. A reference signal undergoes the same precoding operation as the corresponding data channel. Important benefits of a dedicated reference signal are non-constrained precoding, no need for a transmitted pre-coding matrix indicator in downlink signaling, and reduced overall reference signal overhead compared to the use of common non-precoded reference signals (because the amount of dedicated reference symbols scales with transmission rank).

The initialization and mapping of a dedicated reference signal in presently known 3GPP systems have the following features as described in 3GPP TS 36.211, v8.7.0, entitled "Evolved Universal Terrestrial Radio Access (E-UTRA); Physical Channels and Modulation," and in 3GPP Technical Document ("Tdoc") R1-081106, entitled "Way Forward on Scrambling Sequence Initialisation," produced by Nokia Siemens Networks, Nokia, Ericsson, Qualcomm, Samsung, Panasonic, and Motorola, which are incorporated herein by reference. A dedicated reference signal is produced with a re-initialization period of one subframe (e.g., 1 millisecond ("ms")) and a sequence periodicity of one radio frame (e.g., 10 ms). The dedicated reference signal is transmitted as a Gold code sequence modulated on to a quadrature phase shift keyed ("QPSK") signal. The dedicated reference signal is initialized with a value dependent on the user equipment identification ("UE ID," also known as cell radio network temporary identifier "C-RNTI"), the cell identification (cell "ID," also known as physical cell ID) of a communication system, and the subframe number. The dedicated reference signal is then mapped to allocated resource elements ("REs") of assigned physical resource blocks of a subframe employing a frequency-time order. In a frequency-time order, the dedicated reference signal frequency/time components are mapped to a set of frequencies in a physical resource block at a particular time step, and then mapped to another set of frequencies in that physical resource block at a later time step. The generation and resource allocation of dedicated reference signals described in Release 8 of 3GPP specifications reuse most of the principles of the associated physical downlink shared channel ("PDSCH") scrambling and mapping.

For a dedicated reference signal as described above, the sequence and phase content in a given subframe of a given cell depend on the UE ID (e.g., cell radio network temporary identifier ("C-RNTI") or semi-persistent scheduling ("SPS") C-RNTI), and also on the physical resource block assignment for the user equipment. This known structure enables the possibility of transparent MU-MIMO operation in transmission mode 7, as described in 3GPP TS 36.213, v8.7.0, entitled "Evolved Universal Terrestrial Radio Access (E-UTRA); Physical Layer Procedures," which is incorporated herein by reference. Two or more user equipment allocated overlapping sets of physical resource blocks can be spatially separated as well as their dedicated reference signal can be transmitted in overlapping resource elements that are quasi-orthogonal due to the use of different UE IDs.

However, techniques that have been discussed in the industry include the use of orthogonal demodulation reference signals ("DM-RSs") between space division multiplexed ("SDM") users within one cell or multiple cells (e.g., code division multiplex ("CDM")-based reference signals). Multi-cell MU-MIMO are also known as coordinated multi-point transmission/reception ("CoMP"), as described in the 3GPP TS 36.814, v1.0.0, cited hereinabove.

An issue that has been discussed in the industry is the ability to track and suppress multi-user ("MU") interference of space-division multiplexed user(s), as described in the document 3GPP Tdoc R1-092771, entitled "Beamforming Based MU-MIMO," and in PCT Application No. PCT/IB2010/000691, entitled "System and Method for Signaling of Interfering Spatial Layers with Dedicated Reference Signals," filed Mar. 26, 2010, based on U.S. patent application Ser. No. 61/164,249. These documents are incorporated herein by reference. This issue may require that the dedicated reference signal phase and content be invariant to the UE's ID and to the assigned physical resource block(s).

Thus, a reference signal generation and resource mapping arrangement employing common reference signal initialization and mapping as described in 3GPP TS 36.211, v8.7.0, cited hereinabove, is known, wherein the reference signal has a re-initialization period dependent on each (reference signal bearing) OFDM symbol and the (typical) 10 ms reference signal periodicity. The reference signal is QPSK or BPSK modulated, and the reference signal sequence is initialized with a value dependent on a cell ID, subframe number (or slot number within a radio frame), and OFDM symbol number (within a subframe/slot), but without a UE ID. For the mapping of each OFDM symbol, the reference signal sequence is generated assuming full system bandwidth, and then the middle sequence part corresponding to the cell's actual bandwidth is transmitted so that the phase of the sequence in the middle of the bandwidth is system bandwidth invariant. Furthermore, the document 3GPP Tdoc R1-090875, entitled "Further Considerations and Link Simulations on Reference Signals in LTE-A," produced by Qualcomm, which is incorporated herein by reference, indicates that the dedicated reference signal sequence should be common to all cells participating in multi-cell transmission (CoMP transmission points) to a user equipment (for joint transmission and processing) without specifying an exact solution. Further, it appears that the usage of physical resource block-specific scrambling (e.g., by adding a PRB/PRB pair index as a sequence initializer) is suggested by the document 3GPP Tdoc R1-092584, entitled "Downlink Multi-Cell Demodulation Reference Signal Design," which is incorporated herein by reference. It should be noted that in 3GPP Technical Specifications Release-8, a common reference signal does not include a UE ID.

A disadvantage of the common reference signal method is that it departs from the general principles of dedicated reference signal initialization and mapping as described in 3GPP Technical Specifications Release-8 such as a re-initialization period of one subframe and frequency-first mapping to resource elements. A disadvantage of adding a physical resource block identification as an additional initializing element for a dedicated reference signal sequence is that it creates multiple short sequences within an assignment of a physical resource block(s) to the user equipment. Furthermore, it consumes the initialization space, which is a maximum of 31 bits, which might be a scarce resource considering other possible extensions of the dedicated reference signal initialization (e.g., a longer multi-cell ID instead of a cell ID). Finally, removing the UE ID from the set of dedicated reference signal initializing elements might either restrict the MU-MIMO operation to space division multiplexing for the number of user equipment implied by the number of orthogonal dedicated reference signal ports, or cause a channel estimation phase mismatch in the case wherein the same dedicated reference signal resource elements and sequences (without a code division multiplexing separation) are used for multiple users.

Figure 6:
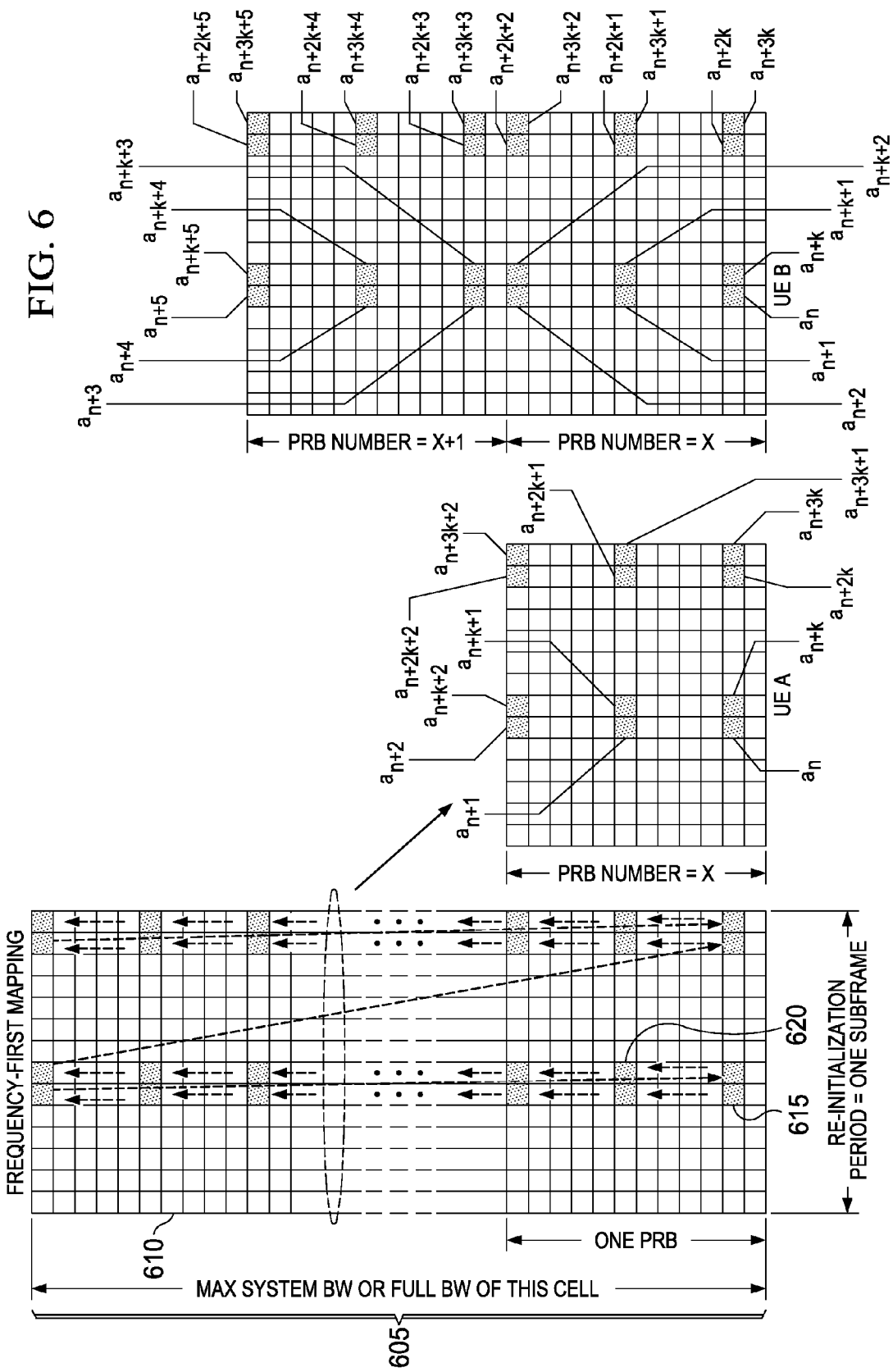
FIG. 6 illustrates a time and frequency diagram illustrating an embodiment of a reference signal transmitted between a base station and user equipment formed with time subframes represented along the horizontal axis and subcarriers of frequency represented along the vertical axis according to the principles of the present invention.

As introduced herein, a dedicated reference signal is generated for each subframe assuming a bandwidth formed from a plurality of physical resource blocks (e.g., the maximum system bandwidth or a full bandwidth of a given cell), and the relevant part(s) of the sequence that are used are limited by the user equipment's physical resource block allocation. As a result, the phase and content of the dedicated reference signal in an assigned physical resource block(s) are predictable, but the actual assignment of the user equipment's physical resource block(s) may be random. In the simplest case, this operation assumes that the UE ID is not used to initialize the scrambling sequence, and the scrambling sequence mapping is assumed to be frequency first, assuming the full physical resource block allocation in the communication system bandwidth (e.g., the maximum possible bandwidth or a full bandwidth of a cell of the communication system). The scrambling sequence, prior to transmission, can be symbol-wise multiplexed with an orthogonal code such as a Walsh code (the orthogonal code is used to separate spatial layers of one or multiple user equipments). This scrambling operation of generating a dedicated reference signal according to an exemplary embodiment is illustrated in FIG. 6 as described below. As a separate step to enable dynamic switching in and out of MU-MIMO based on orthogonal dedicated reference signal and MU-MIMO based on quasi-orthogonal dedicated reference signal (and single user-MIMO), the UE ID (e.g., a C-RNTI) may be included in the dedicated reference signal scrambling sequence initialization depending on an indicator bit (e.g., a multi-user indicator bit).

Turning now to FIG. 6, illustrated is a time and frequency diagram illustrating an embodiment of a reference signal transmitted between a base station and user equipment formed with time subframes represented along the horizontal axis and subcarriers of frequency represented along the vertical axis according to the principles of the present invention. The system bandwidth or the full bandwidth of a cell associated with a base station is represented by the vertical extent 605 of the subframe. A group of 12 subcarriers of frequency represents one physical resource block, and a particular subcarrier frequency at a particular step of time represents one resource element, such as the resource element 610. One or more physical resource blocks may be assigned to a particular user equipment, or a plurality of user equipment may be assigned to one or more physical resource blocks in MIMO operation. For instance, user equipment A is assigned to one physical resource block (one PRB-pair) and user equipment B is assigned to two physical resource blocks (two PRB-pairs).

A dedicated reference signal is assigned to a set of allocated resource elements in a frequency-first mapping arrangement, wherein a first element (or a first element pair) of a reference signal is assigned to a resource element such as resource element (or resource element pair) 615, and the second element (or the second element pair) of the reference signal is assigned to a second resource element such as resource element (or resource element pair) 620. Continuing allocations of elements of the reference signal to further allocated resource elements proceeds as indicated by the dashed arrows in FIG. 6, with the allocated resource elements designated as dashed boxes. It should also be noted that an in the FIGURE represents the nth symbol of the scrambling sequence (a bit pair of the scrambling sequence for QPSK scrambling or one bit of the scrambling sequence for BPSK scrambling) and k in the FIGURE represents the number of allocated resource elements in a dedicated reference signal bearing OFDM symbol assuming the full bandwidth of the cell (or the maximum system bandwidth) of a communication system. Also, the elements of one pseudo noise code sequence are used within the user equipment's physical resource block allocation.

The example illustrated in FIG. 6 assumes allocation of resource elements of the reference signal as described in 3GPP Tdoc R1-092554, entitled "UE-Specific Reference Symbols for Dual Layer Beamforming," produced by Nokia and Nokia Siemens Networks, 3GPP Tdoc R1-092556, entitled "UE-Specific Reference Symbol Multiplexing for LTE Advanced Downlink," and in 3GPP Tdoc R1-092686, entitled "Link Analyses of Different Reference Signal Designs for Dual-Stream Beamforming," produced by Qualcomm, which are incorporated herein by reference. Of course, the principles of present invention are not limited to the reference signal pattern or multiplexing scheme described above. With this pattern and multiplexing scheme, an orthogonal code of length two runs over two time-adjacent resource elements so that two single-user MIMO ("SU-MIMO") layers or two MU-MIMO users can be assigned separate orthogonal dedicated reference signal ports. Two spatial layers are an example of providing further signal separation of the user equipment, and such a scheme naturally extends to an arbitrary number of layers and antenna ports.

As can be seen in FIG. 6, the dedicated reference signal scrambling sequence phase and content in a given resource element is invariant to the assignment of the physical resource block(s). Thus, user equipment A, to whom the first orthogonal code is assigned, can know the dedicated reference signal sequence (in this case a scrambling symbol sequence such as a Gold code multiplied with an orthogonal code sequence such as a Walsh code) of another user equipment that uses the same time-frequency resources due to possible MU-MIMO operation. This example uses a code-division multiplexing-based dedicated reference signal structure, but the process is also applicable to time-division multiplexing ("TDM"), frequency-division multiplexing ("FDM") or hybrid dedicated reference signal structures.

An aspect of this invention that is also applicable to the methods mentioned hereinabove is related to enabling dynamic switching in and out of MIMO transmission schemes, which can be MU-MIMO based on orthogonal dedicated reference signal, MU-MIMO based on quasi-orthogonal dedicated reference signal and multi-layer spatial multiplexing. This aspect is also applicable to known reference signal formation and allocation processes described previously hereinabove. In the context of the Work Item described in the document 3GPP WID RP-090359 entitled "Enhanced DL transmission for LTE," cited previously hereinabove, the need for signaling (dynamic, semi-static or implicit) of the following information elements or a combination thereof have been discussed.

The number of enabled layers/codewords (e.g., 1 or 2) is discussed in the document 3GPP Tdoc R1-092553, entitled "DL Control Signalling for Dual-layer Beamforming in Rel'9," produced by Nokia and Nokia Siemens Networks, and in the document 3GPP Tdoc R1-092632, entitled "Control Signaling for LTE Rel-9 Enhanced DL transmission," produced by Motorola, which documents are incorporated herein by reference. The dedicated reference signal port number and index of the orthogonal code (e.g., number 0/number 1), is discussed in the document 3GPP Tdoc R1-092632, cited previously hereinabove. This signaling might be relevant when the number of enabled layers or the transmission rank is one. The multi-user indication (presence/absence) of a paired multi-user(s) on the same (or a subset/superset of) allocated physical resource blocks, is described in the document 3GPP Tdoc R1-092632, previously cited hereinabove, and in PCT Application No. PCT/IB2010/000691, cited previously hereinabove. Again, this signaling might be relevant when the number of enabled layers or the transmission rank is one. In the case wherein an indicator such as a multi-user indicator signals absence of a paired multi-user(s), the user equipment and base station include the UE ID in the dedicated reference signal scrambling sequence initialization enabling either single user transmission or MU-MIMO transmission based on a quasi-orthogonal dedicated reference signal with an arbitrary number of multi-users. Tracking/suppression of multi-user interference is generally not possible in this case, but then the user equipment is not expected to perform this interference suppression. In general (when utilizing quasi-orthogonal dedicated reference signal), the multi-user spatial interference is also assumed to be low so that spatial interference cancellation is not necessarily needed. In the case wherein an indicator such as a multi-user indicator signals the presence of paired multi-user(s), the user equipment and base station do not include the UE ID in the dedicated reference signal sequence initialization enabling MU-MIMO based on the orthogonal dedicated reference signal and/or possibly multi-user interference suppression/tracking and/or per physical resource block multi-user presence detection. In this case, the number of space-division multiplexed multi-users can be limited by the number of orthogonal dedicated reference signal ports.

Processes for reference signal construction and resource allocation as introduced herein can be combined with the solution of including the antenna port index in reference signal sequence initialization without a need for additional signaling as described in the document 3GPP Tdoc R1-080940, entitled "Scrambling Sequence Initialisation," produced by Nokia Siemens Networks and Nokia, and the document 3GPP Tdoc R1-080640, entitled "Specification Details for PRS Sequences," produced by Qualcomm, which documents are incorporated herein by reference. When the dedicated reference signal scrambling sequences on different layers do not have to be the same (e.g., due to code-division multiplexing of the dedicated reference signal of different multi-users or code-division multiplexing of different single-user layers), it is preferable to also use the reference signal port/port group index in the reference signal initialization to avoid correlated inter-cell interference due to the same sequences transmitted on different resource elements.

A number of technical effects accrue from construction of a reference signal and the associated allocation of a resource as introduced herein. Reference signal scrambling is now invariant, because the dedicated reference signal scrambling sequence in a given PRB does not depend on the actual PRB allocation. There is reuse of functionality because most of the previously developed scrambling sequence principles in 3GPP specifications such as QPSK modulation, frequency-first mapping, per subframe re-initialization can be reused in later releases of these specifications to comply with new requirements on orthogonal code division multiplexed dedicated reference signal between multi-users, and/or allowing multi-user interference detection/suppression. Compared to previous 3GPP specification releases, from the point of view of a base station, now a single dedicated reference signal scrambling sequence may be generated per subframe regardless of the number of frequency division multiplexed user equipment. For dynamic switching of MU-MIMO based on orthogonal and quasi-orthogonal dedicated reference signals, selectively including or excluding the UE ID from dedicated reference signal scrambling sequence initialization allows a base station to make a trade-off between the number of supported multi-users and their mutual reference signal orthogonality.

Figure 7:
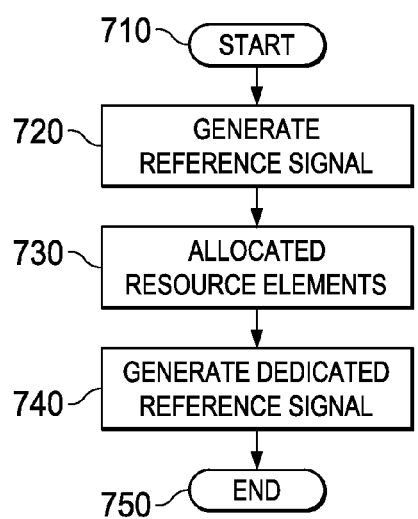
FIG. 7 illustrates a flow chart demonstrating an exemplary process to initialize and map reference signals in a communication system according to the principles of the present invention.

Turning now to FIG. 7, illustrated is a flow chart demonstrating an exemplary method to initialize and map reference signals in a communication system according to the principles of the present invention. The method begins in a module or step (hereinafter "module") 710. In a module 720, a reference signal employable with a plurality of physical resource blocks is generated according to a frequency-time order. In a module 730, resource elements of an assigned physical resource block(s) from the plurality of physical resource blocks are allocated to a user equipment. In a module 740, a dedicated reference signal for the user equipment is generated by allocating elements of the reference signal to allocated resource elements of the assigned physical resource block(s). The dedicated reference signal may be generated in accordance with a user equipment identification, a cell identification, the assigned physical resource block, and a subframe number associated with the assigned physical resource block. The method ends in the module 750.

Thus, an apparatus (e.g., a processor) and method employable in a base station or user equipment is introduced herein for initializing and mapping of reference signals in a communication system. In one embodiment, the processor is configured to generate a reference signal employable with a plurality of physical resource blocks (e.g., via a sequence generator). The reference signal may be generated according to a frequency-time order, and in accordance with a pseudo noise code such as a Gold code. The plurality of physical resource blocks typically span a range of frequency and time components and may span a bandwidth of a cell.

The processor is also configured to allocate resource elements of an assigned physical resource block(s) from the plurality of physical resource blocks to a user equipment, and generate a dedicated reference signal for the user equipment by allocating elements of the reference signal to allocated resource elements of the assigned physical resource block(s) (e.g., via a resource allocator). The allocated resource elements generally include frequency and time components. The dedicated reference signal may be generated in accordance with an antenna port index of the user equipment or an index of a code group. Additionally, the dedicated reference signal may be generated in accordance with a user equipment identification, a cell identification of a communication system, the assigned physical resource block, and a subframe number associated with the assigned physical resource block.

Program or code segments making up the various embodiments of the present invention may be stored in a computer readable medium or transmitted by a computer data signal embodied in a carrier wave, or a signal modulated by a carrier, over a transmission medium. For instance, a computer program product including a program code stored in a computer readable medium may form various embodiments of the present invention. The "computer readable medium" may include any medium that can store or transfer information. Examples of the computer readable medium include an electronic circuit, a semiconductor memory device, a read only memory ("ROM"), a flash memory, an erasable ROM ("EROM"), a floppy diskette, a compact disk ("CD")-ROM, an optical disk, a hard disk, a fiber optic medium, a radio frequency ("RF") link, and the like. The computer data signal may include any signal that can propagate over a transmission medium such as electronic communication network channels, optical fibers, air, electromagnetic links, RF links, and the like. The code segments may be downloaded via computer networks such as the Internet, Intranet, and the like.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage medium embodying computer program code (i.e., software or firmware) thereon for execution by the computer processor.

Although the present invention and its technical effects have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. Also, many of the features, functions and steps of operating the same may be reordered, omitted, added, etc., and still fall within the broad scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
   at least one processor; and
   memory storing computer program code;
   wherein said memory and said computer program code are configured to, with said at least one processor, cause said apparatus to at least:

generate a reference signal employable with a plurality of physical resource blocks, the plurality of physical resource blocks spanning a range of frequency and time components corresponding to the full bandwidth of a communication system, allocate resource elements of an assigned physical resource block from said plurality of physical resource blocks to a user equipment, generate a dedicated reference signal sequence for said user equipment by allocating elements of said reference signal in accordance with allocated resource elements of said assigned physical resource block and in accordance with an antenna port index of said user equipment, and initialize said dedicated reference signal sequence in each subframe according to a subframe number.

2. The apparatus as recited in claim 1 wherein said memory and said computer program code are further configured to, with said processor, cause said apparatus to generate said dedicated reference signal sequence in accordance with information related to user equipment identification or cell identification of said communication system.

3. The apparatus as recited in claim 1 wherein said memory and said computer program code are further configured to, with said processor, cause said apparatus to generate said reference signal according to a frequency-time order.

4. The apparatus as recited in claim 1 wherein said memory and said computer program code are further configured to, with said processor, cause said apparatus to generate said dedicated reference signal sequence by allocating elements of said reference signal to said allocated resource elements of said assigned physical resource block in a frequency-first mapping arrangement.

5. The apparatus as recited in claim 1 wherein said allocated resource elements comprise frequency and time components.

6. A non-transitory computer readable medium storing a program of instructions, execution of which by a processor configures an apparatus to at least:

generate a reference signal employable with a plurality of physical resource blocks, the plurality of physical resource blocks spanning a range of frequency and time components corresponding to the full bandwidth of a communication system;

allocate resource elements of an assigned physical resource block from said plurality of physical resource blocks to a user equipment;

generate a dedicated reference signal sequence for said user equipment by allocating elements of said reference signal in accordance with allocated resource elements of said assigned physical resource block and in accordance with an antenna port index of said user equipment; and initialize said dedicated reference signal sequence in each subframe according to a subframe number.

7. The non-transitory computer readable medium as recited in claim 6 wherein said program code stored in said non-transitory computer readable medium is configured to generate said dedicated reference signal sequence in accordance with information related to user equipment identification or cell identification of said communication system.

8. A method, comprising:

generating a reference signal employable with a plurality of physical resource blocks, the plurality of physical resource blocks spanning a range of frequency and time components corresponding to the full bandwidth of a communication system;

allocating resource elements of an assigned physical resource block from said plurality of physical resource blocks to a user equipment generating a dedicated reference signal sequence for said user equipment by allocating elements of said reference signal in accordance with allocated resource elements of said assigned physical resource block and in accordance with an antenna port index of said user equipment; and initializing said dedicated reference signal sequence in each subframe according to a subframe number.

9. The method as recited in claim 8 further comprising generating said dedicated reference signal in accordance with information related to user equipment identification or cell identification of said communication system.

10. The method as recited in claim 8 further comprising generating said reference signal according to a frequency-time order.

11. The method as recited in claim 8 further comprising generating said dedicated reference signal sequence by allocating elements of said reference signal to said allocated resource elements of said assigned physical resource block in a frequency-first mapping arrangement.

12. The method as recited in claim 8 wherein said allocated resource elements comprise frequency and time components.

* * * * *